STEREO RECEIVER WITH TWO-CHANNEL DIFFERENTIAL AMPLIFIER

Filed March 28, 1967

Inventor
Fleming Dias
By Francis W. Crotty
Attorney

United States Patent Office 3,497,628
Patented Feb. 24, 1970

3,497,628
STEREO RECEIVER WITH TWO-CHANNEL DIFFERENTIAL AMPLIFIER

Fleming Dias, Chicago, Ill., assignor to Zenith Radio Corporation, Chicago, Ill., a corporation of Delaware Filed Mar. 28, 1967, Ser. No. 626,522
Int. Cl. H04h *5/00;* H03f *3/68*
U.S. Cl. 179—15 6 Claims

ABSTRACT OF THE DISCLOSURE

A receiver for an FCC approved stereo-FM transmission and including a two-channel differential amplifier as part of the apparatus for operating on a composite stereo signal available at the output of the FM detector. The differential amplifier translates the audio sum component with a given gain as common mode information while it translates the difference signal component of the stereo signal with a greater gain as differential mode information. Three embodiments are disclosed.

CROSS-REFERENCES TO RELATED APPLICATIONS (1) Application Ser. No. 599,468, filed Dec. 6, 1966, entitled "Stereo Receiver Suitable for Integrated Circuit Construction" to Fleming Dias.

(2) Application Ser. No. 626,482, filed concurrently herewith to Fleming Dias and entitled "Wave Signal Receiver." Both of the above applications are assigned to the same assignee as the present invention.

BACKGROUND OF THE INVENTION

The present invention relates generally to receivers for stereophonic program signals and, more particularly, to new and improved circuit arrangements for developing separated stereophonic program signals from a received composite stereo signal.

Under presently accepted FCC standards, the modulation components of a stereophonic transmission comprise an audio sum component $(L+R)$, a difference signal component $(L-R)$ present as amplitude modulation of a suppressed subcarrier, and a pilot tone used to synchronize receiver instruments in demodulation of the difference signal component. The stereophonically related L and R audio signals may be separately developed at the receiver by any one of several known circuit constructions. In one arrangement utilizing an "average" detector, both the audio sum signal and the difference signal modulation are concurrently applied to the subcarrier detector. A characteristic of this type of detector is difference in efficiency between merely translating the audio sum signal and detecting the difference signal which action results in an imperfect matrixing of the sum and detected difference information at the two output terminals of the detector. Accordingly, each output constitutes primarily one of the stereo signals with a small, unwanted signal contribution from the other signal. Conventionally, total separation is attained by coupling a matrixing signal, constituting the sum signal in proper magnitude and phase to precisely cancel the cross-talk, to each output terminal. In addition to requiring a matrixing network, this circuit also has the disadvantage of providing materially different levels of reproduction depending on whether stereo or monaural signals are received unless further compensating circuitry is provided. This compensating circuitry complicates construction especially if this portion of the receiver is to be fabricated by integrated circuit techniques.

Yet another arrangement for developing the separate stereo signals is known as a "peak" detector. Here both components of the composite stereo signal are again concurrently applied to the detector and the detector acts thereon with equal efficiency to provide the separated program signals at its output. However, this arrangement, like that previously described provides no signal gain and it is more prone to intermodulation interference with the SCA channel.

Equal level reproduction is also provided by another arrangement wherein the modulated subcarrier is segregated from the sum signal by a bandpass filter and detected and developed in a positive and negative phase. The audio sum signal is conveyed by a separate path to a matrix wherein it is combined with both phases of the difference signal information to develop the separate stereo program signals. However, discrete inductor type bandpass filters are not compatible with the limitations of integrated circuit construction and functional equivalents which are compatible are generally unreasonably complex and are to be avoided if possible. In this regard, it will be recognized that transistors and resistors are readily constructed in integrated form. A more complete discussion of the integrated circuit art and its limitations may be had by reference to the aforementioned Dias application, Ser. No. 599,468.

SUMMARY OF THE INVENTION

It is therefore an object of the present invention to provide new and improved apparatus for developing separated stereophonic program signals which apparatus overcomes the above-noted deficiencies of the prior art and which is itself fully compatible with the limitations of the integrated circuit art.

It is a further object of the present invention to provide an improved stereo receiver including a two-channel differential amplifier for assuring proper separation of stereo program signals while also conveniently providing equal levels of reproduction during monaural and stereo reception.

It is another object of the present invention to provide a novel, combined detector and controlled differential active matrix network for a stereo receiver.

It is yet another object of the present invention to provide novel means for developing the difference signal information separately from the audio sum signal without the presence of a bandpass filter.

Accordingly, the invention relates to a receiver for developing a pair of stereophonically related program signals from the composite signal comprising the sum of two audio signals and a subcarrier which is suppressed-carrier amplitude-modulated in accordance with the difference of the two audio signals. More specifically, the invention is directed to means for developing a reference signal having a frequency related to that of the subcarrier, and signal developing means, responsive to the composite and reference signals, for developing the audio sum signal and audio difference signal modulation. A two-channel differential amplifier, having an individual load impedance for each channel thereof, is included in the signal developing means for translating the audio sum component with a first predetermined gain as common mode information and for translating the difference signal component with a predetermined greater gain as differential mode information. Signal utilization means are coupled to the individual load impedances of the differential amplifier.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawing, in the several figures of which like reference numerals identify like elements, and in which:

DESCRIPTION OF THE PREFERRED EMBODIMENTS

Figures 1, 2:
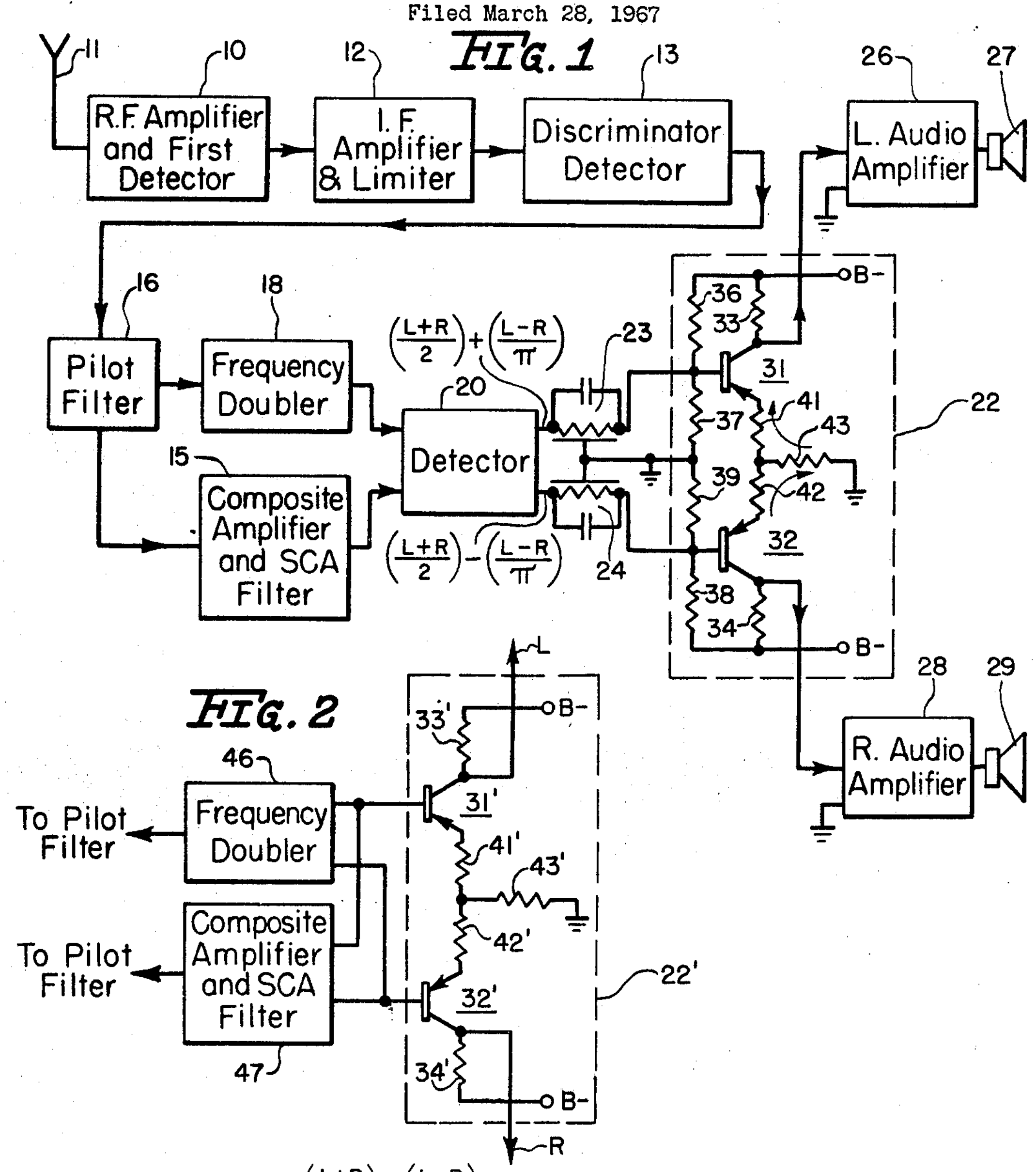
FIGURE 1 is a schematic diagram of a stereo receiver embodying the present invention.
FIGURE 2 is a partial schematic diagram of a stereo receiver illustrating an alternative embodiment of the invention.

Referring now to FIGURE 1, the stereophonic receiver there shown comprises circuits which through the subcarrier detector are conventional. These include a radio frequency amplifier of any desired number or stages and a heterodyning stage or first detector, both being represented by block 10. The input of the amplifying portion connects with a wave-signal antenna 11 and the output is coupled to a unit 12 which may include the usual stages of intermediate-frequency amplification and one or more amplitude-limiters. Following IF amplifier and limiter 12 is a frequency modulation detector 13 responsive to the amplitude-limited IF signal for deriving an output signal representing the modulation of the received carrier. Second detector 13 may be of any well-known configuration, but since a high degree of amplitude-limiting is desirable, it is preferable that this unit be a ratio detector.

The composite stereo modulation signal, developed at the output of detector 13, is applied to a composite signal amplifier and SCA filter 15 through a series connected pilot filter 16; filter 16 represents a relatively low impedance to all but the pilot tone. The SCA filter of block 15 serves as an attenuator for the subcarrier frequency used for Subsidiary Communications Authorization (SCA) reception, a subscription background music service authorized by the Federal Communications Commission. It is ordinarily necessary to bypass this signal or otherwise an annoying audio "swish" is produced as a product of a heterodyning of this signal with the third harmonic of the pilot tone. As will be pointed out later herein, one embodiment of the invention permits this filter to be considerably simplified or eliminated, an especially attractive feature for integrated circuit applications.

Since, as previously explained, the receiver must be properly synchronized for detection of the modulated subcarrier, there is provided means for locally deriving a reference signal having a frequency equal to that of the absent subcarrier. This includes the pilot filter 16 which selectively extracts the pilot tone from the composite signal modulation and applies this tone to a frequency doubler and amplifier 18. Doubler 18 operates on the pilot tone to develop a reference or switching signal in frequency and phase coherence with the absent subcarrier.

Signal developing means, responsive to the composite stereo and reference signals, are provided for developing the audio sum signal and the audio difference signal modulation components. In the present embodiment, this means comprises a detector 20 connected to the outputs of both frequency doubler 18 and composite amplifier 15. The precise construction of detector 20 is not critical to the present invention, however, the detector is understood to be of the average type previously discussed herein. Examples of suitable detectors of this type for use with the invention are disclosed and claimed in Patent 3,242,-264—De Vries and Patent 3,286,035—Dias et al., both of which patents are assigned to the same assignee as the present invention. The Schmit trigger type detector of the Dias et al. patent is especially attractive for use in integrated circuit applications as this detector is synchronized directly from the full-wave rectified pilot tone and thus an oscillatory circuit tuned to the reference signal frequency and including an inductor is not needed. At any rate, it is significant to recognize that the signals at the respective output terminals of the detector may be written in an expanded sum and difference signal component form, as indicated in the drawing adjacent the respective output terminals of the detector. When presented in this format, it may be appreciated that the sum signal is developed in a common mode, that is, of like polarity at both output terminals while the detected difference signal is developed in a differential mode between these terminals. Furthermore, the differential components are developed at each terminal in a lesser amplitude than is the sum signal.

The signal developing means of the present embodiment of the invention also includes a two-channel differential amplifier 22, shown in dashed outline in the drawing, for translating the audio sum component with a first predetermined gain as common mode information and for translating the audio difference signal component with a predetermined greater gain as differential mode information. At this point, it should be understood that the expression "predetermined gain" as used in the present specification and appended claims defines the absolute magnitude of the ratio of the signal amplitude at the output of an amplifying device to the signal amplitude at its input and that such gain may be greater or less than unity or zero. Differential amplifier 22 is provided with a pair of inputs from respective terminals of detector 20 through conventional de-emphasis networks 23 and 24. Signal utilization means, in the form of individual amplifier and loudspeaker systems 26, 27 and 28, 29 are coupled to respective output terminals of amplifier 22.

Differential amplifier 22 comprises a pair of symmetrical signal channels each including a solid-state amplifying device having a primary electrode coupled to an individual load impedance and further having a control electrode constituting an input for the channel. Herein, the amplifying devices comprise a pair of PNP transistors 31 and 32 each having its collector electrode coupled to a respective one of resistors 33 and 34 which resistors constitute the individual load impedances for corresponding amplifier channels. The control or base electrodes of transistors 31 and 32 are coupled to respective output terminals of detector 20 through de-emphasis networks 23 and 24. A quiescent forward bias is normally applied to the base electrodes of transistors 31 and 32 from center junctions of series voltage divider networks 36, 37 and 38, 39, respectively, each of these networks extending from a B+ supply to ground. The emitter electrodes of transistors 31 and 32 are coupled to a common junction by individual emitter resistors 41 and 42 and from there are coupled to ground through a common emitter load resistor 43. For reasons that will be explained, resistor 43, unlike its counterpart in conventional differential amplifiers, is not of an extremely large magnitude relative to individual emitter resistors 41 and 42; rather resistor 43 is of a considerably lesser magnitude and bears a very specific value relative to the aforesaid emitter resistors.

The receiver of the present invention not only reproduces stereophonic FM broadcasts but is also capable of compatible reception and reproduction of monaural FM transmissions and, in considering the operation of the receiver, it will initially be assumed that a monaural broadcast is being received. Under these circumstances, it is recognized that the signal at the output of detector 13 corresponds to the audio components of this broadcast and that such components are translated substantially unimpeded through pilot filter 16 to composite amplifier 15. Amplifier 15 includes one or more amplifying stages which are normally biased to a class A amplifying condition for properly translating audio frequency components. The monaural information is then applied to detector 20 which in the absence of stereo reception functions as merely a passive translating stage for the audio signals. The detectors of the aforementioned De Vries and Dias et al. patents are constructed to operate in this manner.

Thus, there is developed at the two output terminals of detector 20 audio information which is of a like phase or mode as well as of a like amplitude. This information is applied to the control electrodes of transistors 31 and 32 through conventional de-emphasis networks 23 and 24, respectively, and appears at the collector electrodes of each transistor with a given gain or amplification. It will be recognized by those skilled in the art that the gain provided by each transistor or channel is approximately equal to the product of the current gain, $\alpha$, of the transistor and the ratio of the collector to emitter load impedance of the transistor. Assuming $R_1$, $R_e$ and $R_{cm}$ denote, respectively, the collector, individual emitter and common emitter load impedances, this relation may be written in equation form as follows:

$$\text{Common mode gain for each channel} \approx \alpha \frac{R_1}{R_e+R_{cm}} \approx \frac{R_1}{R_e+R_{cm}} \quad (1)$$

Transistors 31 and 32 as well as the remaining components of each amplifier channel are preferably matched, that is, corresponding components are substantially identical in construction. The signals developed across load resistors 33 and 34 are thus equal in amplitude and are reproduced at like nominal levels by their associated ampilfiers and loudspeakers in conventional fashion.

Assuming that a stereophonic transmission is intercepted by antenna 11, it is now the composite signal of this broadcast that is developed at the output of discriminator 13. This signal is translated through pilot filter 16 which is a low impedance to these components and is applied to detector 20 through composite amplifier 15. Meanwhile, the pilot signal is separated from the composite information by filter 16, doubled in frequency by doubler 18, and is likewise applied as an input to detector 20. The precise manner in which these inputs are utilized by detector 20 varies according to the structure of this device; therefore, the inputs from the frequency doubler and amplifier are only schematically indicated in the drawing by arrows. As previously discussed, the functional nature of detector 20 is such that the sum and detected difference signal information developed at each output terminal is imperfectly matrixed and, more specifically, may be represented in a form indicated adjacent each detector terminal in the drawing.

In accordance with the present invention, matrixing apparatus typically demanded in connection with "average" type detectors is unnecessary. Specifically in this regard, it will be recognized that the sum signal, being common mode information, is developed in individual load resistors 33 and 34 in the same manner and with an identical gain as experienced by monaural information. The audio difference signal, however, experiences a materially different gain because of an apparent reduction in the emitter impedance of both transistors 31 and 32 for differential mode information. The positive phase difference signal applied to transistor 31 develops current flow through emitter resistors 41, 43 in the direction indicated by the arrow adjacent these resistors. On the other hand, the difference signal applied to the base of transistor 32 is of an opposite or negative phase and the current through emitter resistors 42, 43 is therefore of the relative phase indicated by the arrow adjacent these resistors. Thus, as to the difference signal information, there is a net zero current through resistor 43 and a net zero voltage drop thereacross. Hence with respect to the difference signal information a ground potential effectively appears at the center junction of resistors 41 and 42. Assuming the same general nomenclature used previously herein the gain of transistors 31 and 32 for difference signal information may be expressed to a close approximation as follows:

$$\text{Gain of each channel for differential mode information} \approx \alpha \frac{R_1}{R_e} \approx \frac{R_1}{R_e} \quad (2)$$

From Equations 1 and 2 it will be recognized that the gain of transistors 31 and 32 is independent of resistor 43 for differential mode signals but is an inverse function of the value of this resistor for common mode signals. As resistor 43 approaches a zero value, the common and differential mode gains approach equality. Increasing the value of resistor 43 decreases the relative gain for common mode signals and for very large values of resistor 43 the common mode gain of amplifier 22 is approximately zero.

Accordingly, it will now be recognized that resistor 43 may be selected such that the common mode gain is less than the differential mode gain by a factor of $2/\pi$. Of course, a relative gain factor of this magnitude establishes an amplitude equality between the sum and difference signal information in each amplifier channel and thus perfect separation of the L and R stereo signals. The value of common mode resistor 43 for such a condition is given by the following general expression where again $R_1$ denotes a collector load impedance, $R_e$ an individual emitter resistance and $R_{cm}$ a common mode emitter resistance:

$$\frac{R_1}{R_{cm}+R_e} = \frac{2}{\pi}\left(\frac{R_1}{R_e}\right)$$

$$\frac{R_e}{R_1} \cdot \frac{R_1}{R_{cm}+R_e} = \frac{2}{\pi}$$

$$R_{cm} = \left(\frac{2}{\pi} - 1\right) R_e \approx 1.57\ R_e \quad (3)$$

Differential amplifier 22 under the foregoing condition effectively discriminates between common and differential mode signals applied to its input channels to the end that the sum and difference components of the stereo signal are developed in like magnitude across each of resistors 33 and 34 to provide thereat respectively the L and R separated audio signals. These signals are, of course, individually amplified and reproduced in conventional fashion.

A somewhat simplified, alternative embodiment of the invention is illustrated in FIGURE 2. Herein detector 20 is omitted and the differential amplifier serves conjointly as a detector and as a controlled differential active matrix. The components of this differential amplifier may take the same values as that illustrated in FIGURE 1 and, accordingly, the same reference numerals are used excepting only that primes have been added. The biasing network for the base electrodes of the transistors of the differential amplifier as well as the de-emphasis networks 23 and 24 have been omitted from the drawing for the sake of clarity. A frequency doubler 46 provides push-pull or phase opposite outputs of the reference signal which are individually coupled to transistors 31' and 32'. Composite amplifier 47 provides a pair of signal isolated outputs, carrying signal information of like content and phase, which are likewise coupled to respective ones of transistors 31', 32'.

In the operation of this embodiment of the invention, it will be recognized that monaural signals are translated through composite amplifier 47 and amplified by transistors 31' and 32' in the same fashion as previously discussed in connection with FIGURE 1. However, during reception of stereophonic programming, the audio sum signal as well as the modulated subcarrier are applied directly to the control electrodes of transistors 31' and 32'. Concurrently therewith frequency doubler 46 applies a push-pull reference signal to transistors 31' and 32' of a magnitude to render these transistors conductive and nonconductive in alternation at the subcarrier reference frequency rate. In accordance with well understood demodulation theory, it will be recognized that at the emitter junction of transistor 31' there will be developed information corresponding to the product of the composite stereo signal and a 1–0 switching function. At the emitter electrode of transistor 32' there is developed information corresponding to the product of an opposite or 0–1 switching function and the composite stereo signal. Since such on-off switching functions are characteristic of the average detection process, it will be recognized that the audio components developed at these electrodes correspond precisely to the signals developed at the respective output terminals of detector 20 as indicated in FIGURE 1. For the same reasons previously given, the sum and difference signals developed in load resistors 33' and 34' are identical in amplitude and perfect matrixing of these signals occurs at each load resistor. An advantage of the present embodiment over that of FIGURE 1 is in its comparative simplicity by virtue of the entire elimination of detector 20.

Figure 3:
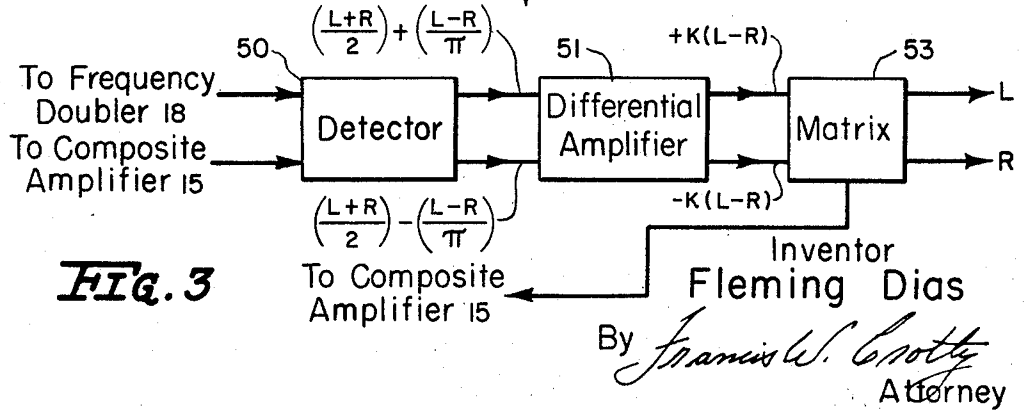
FIGURE 3 illustrates a further alternative embodiment of the invention useful in a stereo receiver.

Another alternative embodiment of the invention is illustrated in FIGURE 3. This construction offers the further and highly attractive advantage of inherently providing equal levels of reproduction during monaural and stereo reception. As previously mentioned herein, certain stereo receivers segregate the sum signal and the modulated subcarrier and then recombine them subsequent to detection of the subcarrier modulation. A disadvantage of such an arrangement is its requirement of a bandpass filter using an inductor. The present invention obviates this requirement while utilizing only components suitable for integrated circuit applications. Specifically, a detector 50 is schematically indicated as being connected to frequency doubler 18 and composite amplifier 15. Detector 50 may be of a like construction to that of detector 20 and develops at its respective output terminal signals of like composition to that of detector 20, as again indicated in the drawing. Both output terminals of detector 50 are coupled to a differential amplifier 51 which is herein indicated in block form for simplicity. Amplifier 51 may be identical to that illustrated in connection with FIGURE 1 excepting only that its common mode impedance is extremely high such that the gain for the common mode information is effectively zero. Under these conditions, the output terminals of amplifier 51 carry only the difference signal information and this information is, of course, developed in respectively a positive and negative phase at these points.

Differential amplifier 51 is in turn coupled to a conventional matrix 53 which is also directly connected to composite amplifier 15. The sum component of the composite signal is combined with the detected difference signal information within matrix 53 in conventional fashion to provide at a pair of output terminals for the matrix the L and R stereo signals separated from one another. The individual amplifying and reproducing systems for these signals are omitted for simplicity.

In connection with this latter embodiment, it will be understood that detector 50 may be omitted and the frequency doubler and composite amplifier directly connected to the differential amplifier in the same manner as discussed in connection with FIGURE 2. In this latter case, the differential amplifier serves effectively as a detector, a bandpass filter and a phase-splitter. This construction is a very material simplification over the prior art. Furthermore, total rejection of common mode information by differential amplifier 51 permits simplification or elimination of the SCA filter usually included within composite amplifier 15. This is attributable to the fact that the annoying audio "swish" produced by heterodyning of the SCA subcarrier and a harmonic of the pilot tone is developed as predominantly common mode information at the input of amplifier 51, which information is effectively rejected by this differential amplifier construction. Elimination of the SCA filter is also highly attractive for integrated circuit applications.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. In a receiver for developing a pair of stereophonically related program signals from a composite signal comprising the sum of said two audio signals and a subcarrier which is suppressed-carrier amplitude modulated in accordance with the difference of said two audio signals, the combination comprising:
- means for developing a reference signal having a frequency equal to that of said subcarrier;
- a two-channel differential amplifier comprising a pair of amplifier devices having a common cross-coupling impedance and individual output load impedances and providing predetermined different gains for common-mode and differential-mode input information respectively;
- means for applying said composite signal in push-push relation to said amplifier devices;
- means for applying said reference signal to said amplifier devices in push-pull relation and in a magnitude to render said devices conductive and non-conductive in alternation to develop in said output load impedances respective ones of said pair of stereophonically related audio signals;
- and signal utilization means coupled to said individual output load impedances.

2. The combination according to claim 1 in which said common cross-coupling impedance is of a magnitude to establish the relative gain of differential mode information over common mode information at approximately $\pi/2$.

3. The combination according to claim 2 in which the components of said channels have matched characteristics and in which said signal utilization means comprises independent amplifying and loudspeaker systems coupled to each of said load impedances.

4. The combination according to claim 3 which further includes means for normally applying a forward operating bias to both of said amplifier devices.

5. In a receiver for developing a pair of stereophonically related program signals from a composite signal comprising the sum of two audio signals and a subcarrier which is suppressed-carrier amplitude-modulated in accordance with the difference of said two audio signals, the combination comprising:
- means for developing a reference signal having a frequency equal to that of said subcarrier;
- a detector, responsive to said composite signal and said reference signal, for developing said audio sum signal and said audio difference signal modulation components in push-push and in push-pull respectively;
- a two-channel differential amplifier coupled to said detector and comprising a pair of amplifier devices having individual output load impedances and a common cross-coupling impedance of a magnitude to effectively reject common mode information and develop substantially only differential mode information in said output load impedances;
- matrixing means coupled to said output load impedances for matrixing said differential mode information developed therein with the sum component of said composite signal to produce separately said two audio signals;
- and signal utilization means coupled to said matrixing means.

6. The combination according to claim 5 which further includes a translating channel for said audio sum signal and in which said signal utilization means comprises a matrix, having a pair of output terminals and coupled to said individual load impedances and to said translating channel, for developing only a respective one of said stereophonically related program signals at each of said output terminals.

No references cited.

KATHLEEN H. CLAFFY, Primary Examiner

BARRY PAUL SMITH, Assistant Examiner

U.S. Cl. X.R.

330—30